United States Patent [19]

Cooley

[11] 3,872,242

[45] Mar. 18, 1975

[54] FACSIMILE FLATBED TRANSCEIVER

[75] Inventor: Austin G. Cooley, Reno, Nev.

[73] Assignee: Litton Medical Products, Inc., Elk Grove, Ill.

[22] Filed: May 4, 1973

[21] Appl. No.: 357,495

[52] U.S. Cl. .................... 178/6, 178/6.7 R, 178/7.6, 178/7.89, 178/DIG. 27, 346/108

[51] Int. Cl. .............................................. H04n 1/10

[58] Field of Search ......... 178/7.6, 6, DIG 27, 7.89, 178/6.7 R; 346/108; 350/285

[56] References Cited

UNITED STATES PATENTS

| | | | |
|---|---|---|---|
| 2,262,584 | 11/1941 | Herriott | 178/7.6 |
| 3,461,229 | 8/1969 | Oppenheimer | 178/6.7 R |

OTHER PUBLICATIONS

IBM Technical Disclosure Bulletin, Vol. 15, No. 10, March 1973, pp. 3259–3260.

*Primary Examiner*—Howard W. Britton
*Attorney, Agent, or Firm*—Robert M. Vargo; Alan C. Rose; Alfred B. Levine

[57] ABSTRACT

A flatbed facsimile apparatus is disclosed that is capable of functioning both as a facsimile transmitter and a facsimile recorder. The apparatus comprises a pair of film stations positioned in front of an objective lens on an optic axis. The first film station, adapted to hold processed X-ray film, is positioned adjacent a fluorescent lamp. The second film station, adapted to hold unexposed film, is mounted a distance closer to the objective lens. An oscillating mirror is positioned on the other side of the objective lens along the optic axis. A stationary mirror is removably mounted adjacent the oscillating mirror to reflect light beams onto an aperture plate. A phototube is positioned behind the aperture plate to generate a signal that is a function of the light intensity passing through the aperture. During the recording mode, the second mirror is removed to enable a recorder lamp to generate light signals and pass them through a second aperture plate which is directly in line with the oscillating mirror along the optic axis. A field lens is positioned adjacent the second aperture plate to reduce the spread of the beam between the aperture and the objective lens.

7 Claims, 2 Drawing Figures

FACSIMILE FLATBED TRANSCEIVER

BACKGROUND OF THE INVENTION

1. Field of the Invention

The present invention relates generally to flatbed facsimile apparatus and more particularly to facsimile apparatus that are capable of either transmitting or recording X-ray and similar pictures.

2. Description of the Prior Art

A flatbed facsimile transmitter of the type employed in this invention is an apparatus which utilizes an optical scanning system for scanning a transparency, such as an X-ray film, and observing the varying degrees of lightness and darkness in the elemental areas thereof. This information is produced by illuminating the scanned area. The light beam passing through or reflected from each elemental area is transmitted through a series of lenses and mirrors to an aperture plate. A photomultiplier pickup is positioned behind the aperture to generate a signal that is a function of the light intensity passing through the aperture.

A flatbed facsimile recorder of the type employed in this invention is a device that receives and transposes the information generated by the photomultiplier pickup into light signals which are transferred through a lens system onto an unexposed X-ray film. The aforementioned information is transposed by a recording lamp which generates light signals, the intensity of which is a function of the generated signals from the photomultiplier.

Heretofore facsimile transmitter devices were capable of functioning only as transmitters, and flatbed facsimile recorders could only function as recorders. A shortcoming with this is that in many systems having multiple stations, it is often desirable to transmit X-ray pictures in both directions between each pair of stations. As a result, each station would need both types of facsimile equipment. This, of course, is quite costly and space-consuming.

SUMMARY OF THE INVENTION

The present invention obviates the above-mentioned shortcomings by providing a single flatbed facsimile apparatus that is capable of performing both transmitting and recording functions without duplicating the costly elements of the optical system, including the mirror drive.

In its broadest aspect, the apparatus comprises at least one X-ray film station positioned between a light source and an objective lens. An oscillating or rotating mirror is positioned on the other side of the objective lens on the optic axis thereof. A second mirror is removably mounted adjacent the oscillating mirror to reflect, during the transmitting mode, a light beam onto an aperture plate. A phototube is positioned behind the aperture plate. During the recording mode, the second mirror is removed, to enable a recorder lamp to pass generated light signals through a second aperture plate and onto the oscillating mirror. The main advantage of the present invention is that the apparatus can be converted from one mode to another simply by removing or adding the second mirror into the system.

The present invention also provides a second film station mounted at a position closer to the objective lens to focus a smaller image from the recorder lamp. During the transmitting mode, the second film station is not occupied so as not to obstruct the light path between the lens and X-ray film station.

The features of the present invention which are believed to be novel are set forth with particularity in the appended Claims. The present invention, both as to its organization and manner of operation, together with the further advantages thereof, may best be understood by reference to the following description, taken in connection with the accompanying drawings.

DESCRIPTION OF THE PREFERRED EMBODIMENT

Figure 1:
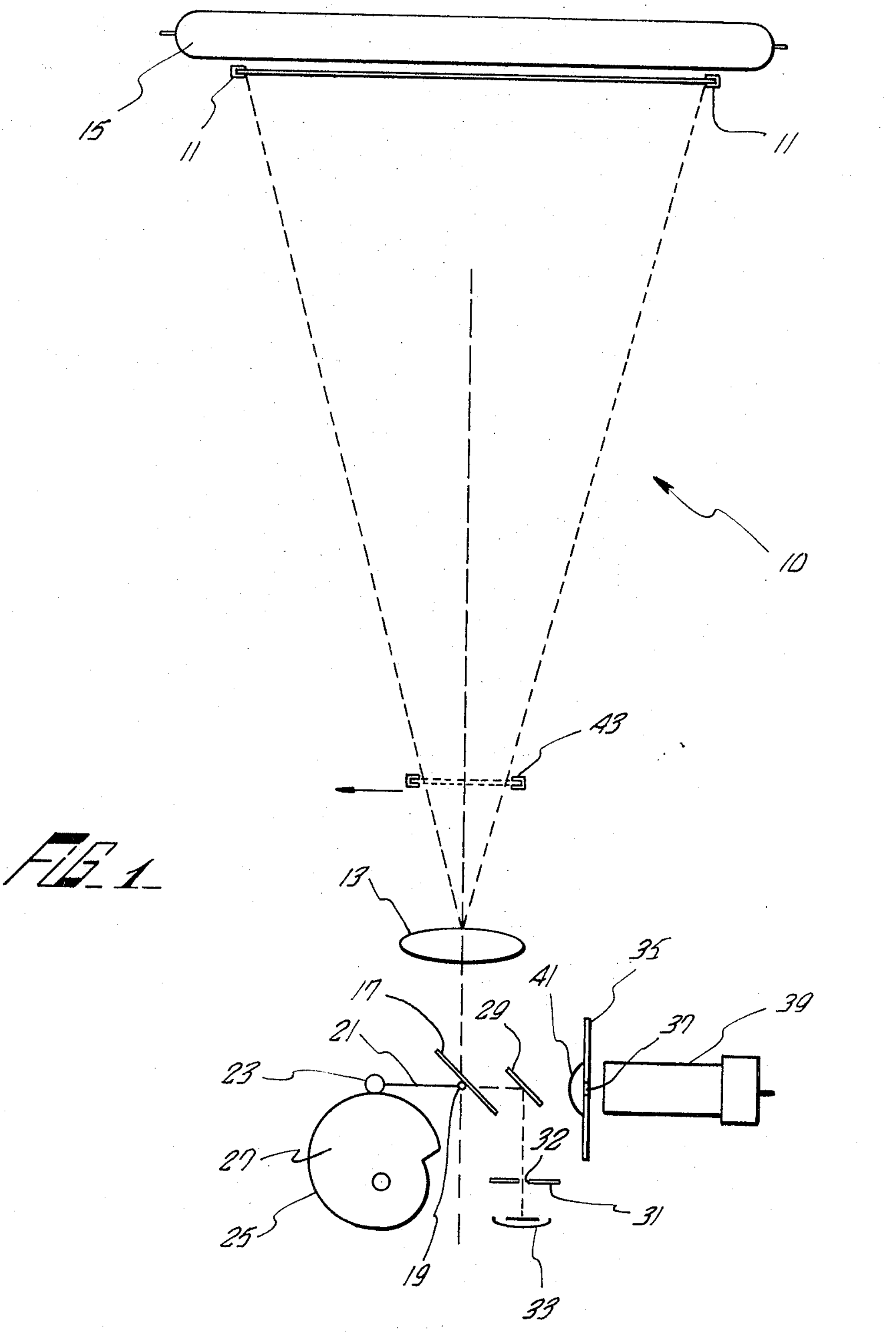
FIG. 1 is a schematic view of a flatbed facsimile transceiver of the present invention in its transmitting mode.
Figure 2:
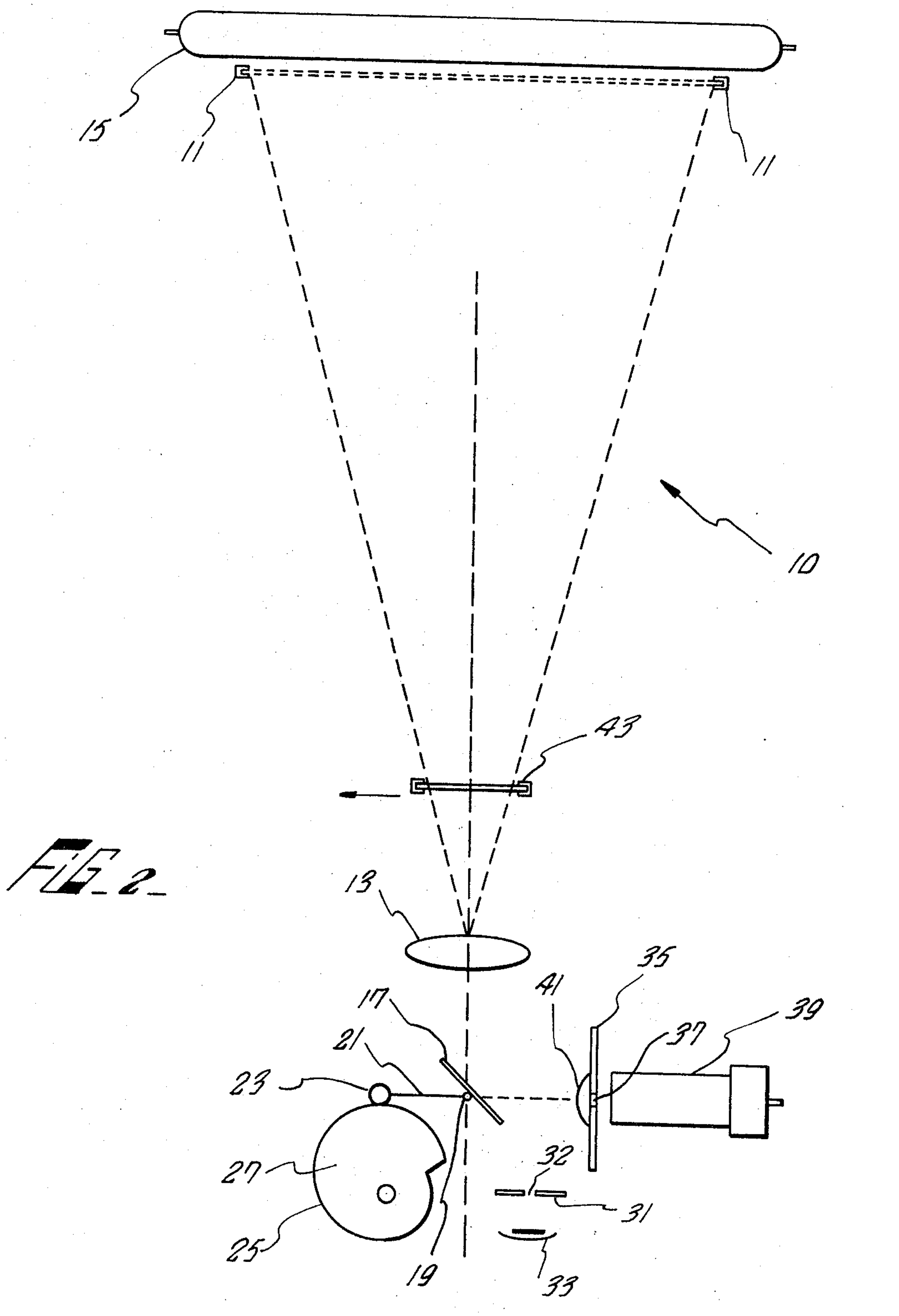
FIG. 2 is a schematic view of the transceiver in its recording mode.

Referring now to the drawings, FIGS. 1 and 2 illustrate a flatbed facsimile transceiver, generally indicated by arrow 10, which is capable of functioning in two modes. In the first mode, the transceiver 10 functions as a facsimile transmitter as shown in FIG. 1. In the second mode, the transceiver 10 functions as a facsimile recorder, as shown in FIG. 2. As a facsimile transmitter, the apparatus 10 functions to scan a transparency, such as an X-ray film, and observe the varying degrees of lightness and darkness in the elemental areas thereof.

In FIG. 1, the processed X-ray film is adapted to be mounted within a film station 11 on a plane perpendicular to the optic axis of an objective lens 13. A fluorescent lamp 15 is mounted behind the film station 11 to illuminate a line across the film over the elemental areas being scanned. At the end of each scanning cycle, or during the scanning cycle, the film is moved vertically by simple mechanical rollers (not shown) a very small distance to permit the next lower line to be scanned.

The illuminated line passes through the objective lens 13 and strikes an oscillating mirror 17. The oscillating mirror 17 functions to rotate about an axis 19 which is perpendicular to the optic axis. This pivoting motion is accomplished by means of a pivot arm 21 connected to the oscillating mirror 17 at the axis point 19. The opposite end of the pivot arm 21 has a roller 23 mounted thereon which is adapted to ride on the camming surface 25 of a rotating cam 27. The camming surface 25 is profiled to cause the mirror to pivot slowly in the scanning direction and then very quickly in the opposite or return direction.

A stationary mirror 29 is positioned approximately 90° from the optic axis to receive the reflected light beams from the oscillating mirror 17 and reflect them onto an aperture plate 31 having an aperture 32. A phototube 33 is positioned behind the aperture plate 31 to generate a signal that is a function of the light intensity passing through the aperture 32.

In operation, an image of the scanning line is focused on the aperture plate 31 after being reflected by the oscillating mirror 17 and the stationary mirror 29. The oscillating mirror 17 functions to sweep the image of the scanning line across the face of the aperture plate 31. The aperture 32 restricts the light passing onto the phototube 33 so that the phototube 33 sees only an elemental area of the illuminated scanning line. In the preferred embodiment, this area is one hundredth of an inch by one hundredth of an inch.

In the apparatus 10 the stationary mirror 29 is detachably mounted in position to function as described above in the transmitting mode and is removed when it is desired to operate the apparatus 10 in its recording mode. This mode is shown in FIG. 2 in which the removed mirror 29 enables a direct light beam path to be conducted between the oscillating mirror 17 and a second aperture plate 35. The aperture plate 35 includes an aperture 37 which is positioned in front of a recording lamp 39. The recording lamp 39 functions to generate a light signal which is a function of the generated signals which are transmitted thereto from a phototube of another facsimile transmitter. The field lens 41 is positioned in front of the aperture 37 to reduce the spread of the beam between the aperture 37 and the objective lens 13 so that less light is lost because of the beam being larger in diameter than the objective lens 13.

For this recording mode a second film station 43 is provided on the optic axis at a position closer to the objective lens 13. The unexposed film used in the second film station 43 is smaller, since it is positioned closer to the objective lens 13. This is possible because the aperture 37 is positioned farther away from the oscillating mirror 17 than the aperture 32. During the transmitting mode, the second film station is not utilized and the unexposed film is removed therefrom.

In operation, the light signals from the recording lamp 39 are passed through the aperture plate 35 and reflected by the oscillating mirror 17 to pass through the objective lens 13 and strike elemental areas of each line of the unexposed film.

An additional advantage of the field lens 41 is that the unexposed film sees only an image of the aperture 37 and not an image of the crater formed in the recording lamp 39. This is accomplished by making the focal end of the field lens 41 such that an image of the crater focuses on the objective lens 13. By doing this, the objective lens 13 does not focus an image of the crater on the recording film. In summary, the facsimile apparatus 10 is changed from a transmitting mode to a recording mode by placing a film within the second film station 43 and removing the stationary mirror 29 out of the path of the scanning beam that is reflected by the oscillating mirror 17.

It should be noted that various modifications can be made to the apparatus while still remaining within the purview of the following claims.

What is claimed is:

1. A facsimile transceiver comprising:

a first film station positioned adjacent a source of illumination;

an objective lens positioned in front of said first film station along a focal axis;

a movable mirror on the other side of said objective lens for reflecting light beams impinging thereon;

first means for producing light signals and projecting said light signals onto said movable mirror, said first means comprising a recorder lamp and a first aperture plate positioned in front of said recorder lamp;

second means for receiving light beams from said illuminated film station and generating signals that are a function of the light intensity received, either of said first or second means being positioned along the optic axis with respect to said movable mirror with the other of said first or second means being positioned at an angle with respect to said optic axis, said second means comprising a second aperture plate and a phototube positioned behind said second aperture plate;

a stationary mirror detachably positioned along the optic axis with respect to said movable mirror to reflect light beams between said movable mirror and said means positioned at an angle to said optic axis, said stationary mirror being removable to enable light beams to pass between said movable mirror and said means positioned along said optic axis; and a second film station detachably positioned between said first film station and said objective lens along said optic axis.

2. The invention of claim 1 wherein said movable mirror comprises a planar mirror adapted to oscillate on an axis perpendicular to said focal axis.

3. The invention of claim 2 wherein said planar mirror is connected to a pivot arm which, in turn, is engageable to the cam surface of a rotating cam.

4. The invention of claim 1 further comprising a field lens positioned directly in front of said second aperture plate along said optic axis.

5. The invention of claim 1 wherein said objective lens is positioned a focal length from said first film station.

6. The invention of claim 1 wherein said second means is positioned at a 90° angle with respect to said optic axis and said stationary mirror is positioned at a 45° angle on said optic axis.

7. The invention of claim 6 wherein said first means is positioned on said optic axis at a distance from said movable mirror approximately twice that of said second means.

* * * * *